(No Model.)

C. L. SCHWARZ.
VEHICLE.

No. 561,287.  Patented June 2, 1896.

Witnesses.  Inventor.
Henry Drury  Chas. L. Schwarz
R. M. Kelly
Attorney.

UNITED STATES PATENT OFFICE.

CHARLES L. SCHWARZ, OF PHILADELPHIA, PENNSYLVANIA.

VEHICLE.

SPECIFICATION forming part of Letters Patent No. 561,287, dated June 2, 1896.

Application filed February 17, 1896. Serial No. 579,480. (No model.)

*To all whom it may concern:*

Be it known that I, CHARLES L. SCHWARZ, of the city and county of Philadelphia, State of Pennsylvania, have invented an Improvement in Vehicles, of which the following is a specification.

My invention relates to vehicles; and it consists of certain improvements which are fully set forth in the following specification and are shown in the accompanying drawings.

My invention is particularly adapted to that class of two-wheeled vehicles known as "brake-carts," in which the seat is supported by the shafts or by a frame which they carry; and my improvements consist particularly in the manner of supporting the seat, whereby greater comfort and security are afforded to the driver and the jolting, so objectionable in carts of this character, is largely removed.

In carrying out my invention I support the seat at each end wholly from the shafts or floor by large spiral springs. The seat is carried by a pair of large flat spiral springs, which are fastened at one end of the shafts or floor in front of the seat and at the other end to a second spring, which is fastened to the shafts or floor at the rear of the seat.

Figure 1:
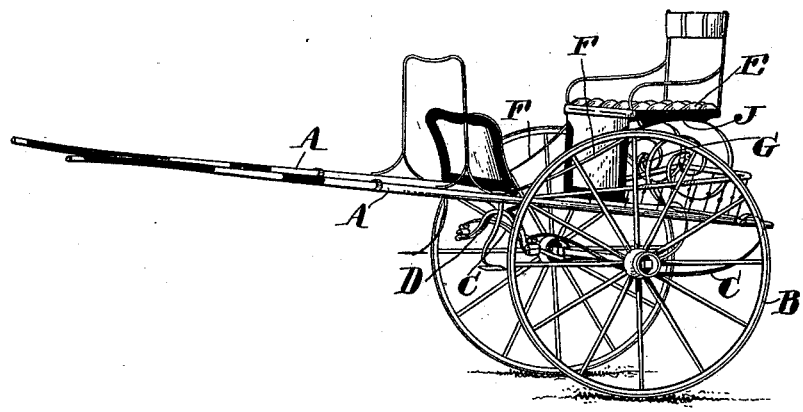
Figure 2:
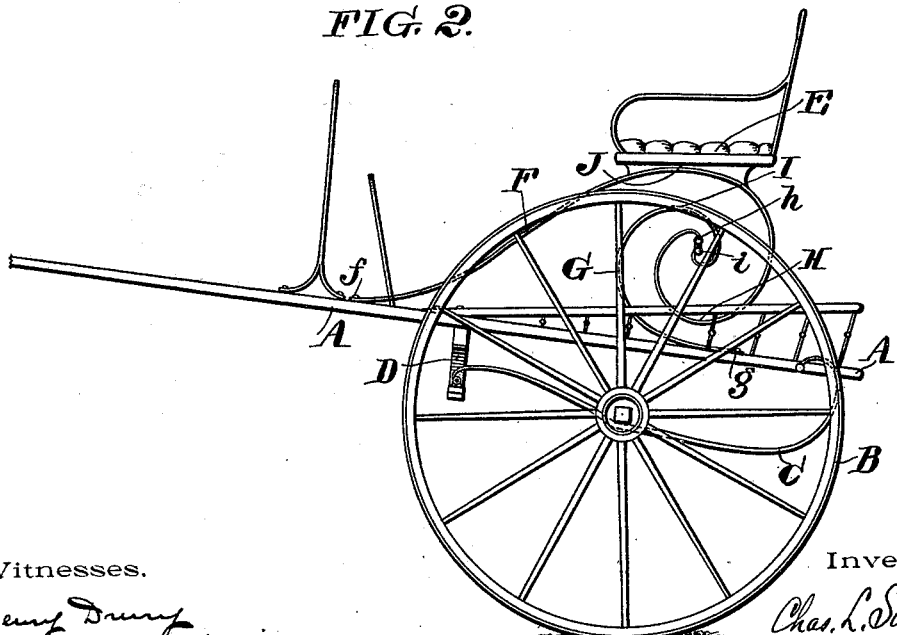

In the accompanying drawings, Figure 1 is a perspective view of a brake-cart embodying my invention; and Fig. 2 is a side elevation of the same, slightly enlarged.

A A are the shafts, which extend rearwardly over the wheels and carry the floor of the cart.

B B are the wheels, the axle of which is supported from the shafts A A by the usual springs C C D.

E is the seat, which is supported from the shafts A A or floor by two large spiral springs F on each side.

The springs F are fastened at one end, as at *f*, to the shafts A in front of the seat, extend rearwardly in an upwardly-ascending curve, then downwardly in a large spiral bend H, and terminate at a joint *h* below the seat, where they are connected with the second pair of springs G.

The springs G are fastened at one end, as at *g*, to the shafts A A or floor in the rear of the seat, and extend forwardly in upwardly-ascending curves, which continue in large bends I about the ends of the springs F, and terminate at points *i* adjacent to the ends *h* of the springs F. The terminals of the springs F and G are fastened together in any convenient manner, as by links and pins.

The seat E is fastened to the upward bends J of the springs F F, as shown, which thus constitute arms or supports rising from the shafts A A and sustained at the rear by auxiliary springs G G. The seat thus supported possesses great elasticity, and the jolting, so objectionable in vehicles of this kind, is largely removed.

It will be observed that the springs F form large bends H below the seat and extend adjacent to the shafts A or floor, and that the springs G form large bends I adjacent to the seat. The advantage of this construction is that if either spring should break the bend of the other spring will form a support to sustain the seat, so that the danger of the seat upsetting or falling and throwing the occupants out of the cart is avoided.

If the spring F at one end should break, the seat would sink down until it rested on the large bend I of the spring G, and if, on the other hand, the spring G should break, the spring F with the seat would sink until the large bend H rested on the floor of the cart.

The springs F and G are preferably composed of broad steel bands.

The minor details of construction shown may be varied without departing from the invention.

What I claim as new, and desire to secure by Letters Patent, is—

1. In a two-wheeled vehicle, the combination with the shafts, of spring-supporting arms consisting of scroll-springs F, F, carried by the shafts and rising therefrom and extending rearwardly, the auxiliary scroll-springs G, G, between the rear of the springs F, F, and the rear of the cart, and the seat carried by the spring-supporting arms.

2. In a brake-cart the combination with the shafts A, A, of the scroll-springs F, F, fastened to the shafts at one end, extending upwardly and rearwardly, and terminating in a large bend H, the scroll-springs G, G, fastened at one end to the rear of the vehicle, extending forward and upward and terminating in the scroll-bend I connected with the terminal of the scroll-bend H, and the seat E carried by the springs F, F.

In testimony of which invention I have hereunto set my hand.

CHARLES L. SCHWARZ.

Witnesses:
  GEO. W. REED,
  R. M. KELLY.